(12) United States Patent
Ketabdar et al.

(10) Patent No.: US 8,376,854 B2
(45) Date of Patent: Feb. 19, 2013

(54) AROUND DEVICE INTERACTION FOR CONTROLLING AN ELECTRONIC DEVICE, FOR CONTROLLING A COMPUTER GAME AND FOR USER VERIFICATION

(75) Inventors: Hamed Ketabdar, Berlin (DE); Mehran Roshandel, Berlin (DE)

(73) Assignees: Deutsche Telekom AG, Bonn (DE); Technische Universataet Berlin, Berlin (DE)

( * ) Notice: Subject to any disclaimer, the term of this patent is extended or adjusted under 35 U.S.C. 154(b) by 52 days.

(21) Appl. No.: 13/017,094

(22) Filed: Jan. 31, 2011

(65) Prior Publication Data
US 2011/0190060 A1 Aug. 4, 2011

Related U.S. Application Data

(60) Provisional application No. 61/300,569, filed on Feb. 2, 2010.

(30) Foreign Application Priority Data

Feb. 2, 2010 (EP) ..................................... 10152404

(51) Int. Cl.
*A63F 9/24* (2006.01)
(52) U.S. Cl. .............................. 463/37; 463/36; 345/156
(58) Field of Classification Search .................... 463/36, 463/37; 345/156
See application file for complete search history.

(56) References Cited

U.S. PATENT DOCUMENTS

| | | | |
|---|---|---|---|
| 5,512,919 A | 4/1996 | Araki | |
| 7,038,658 B2 * | 5/2006 | Seki et al. | 345/156 |
| 7,532,901 B1 * | 5/2009 | LaFranchise et al. | 455/456.6 |
| 8,246,462 B1 * | 8/2012 | Tran et al. | 463/37 |
| 2003/0095115 A1 | 5/2003 | Brian et al. | |
| 2008/0136775 A1 | 6/2008 | Conant | |

FOREIGN PATENT DOCUMENTS

JP 2007-236602 A 9/2007

OTHER PUBLICATIONS

Search Report from corresponding European Patent Application No. 10152404.9 dated Jun. 16, 2010.
Harrison et al., "Abracadabra: Wireless, High-Precision, and Unpowered Finger Input for Very Small Mobile Devices," Human-Computer Interaction Institute, Carnegie Mellon University, Pittsburgh, PA, Oct. 4, 2000, pp. 121-124.
"HoverFlow: expanding the design space of around-device interaction" of Kratz, S. and Rohs, M , published by proceedings of the 11th International Conference on Human-Computer Interaction with Mobile Devices and Services, Bonn, Germany, Sep. 2009.

* cited by examiner

*Primary Examiner* — Corbett B Coburn
(74) *Attorney, Agent, or Firm* — Leydig, Voit & Mayer, Ltd.

(57) ABSTRACT

An electronic device includes an around device interaction module configured to interact with a user of the electronic device. The around device interaction module includes a magnetic sensor operable to measure a magnetic field strength of a magnetic element and a control unit configured to control the electronic device based on a movement of the magnetic element while the magnetic sensor measures the magnetic field strength of the magnetic element.

14 Claims, 4 Drawing Sheets

AROUND DEVICE INTERACTION FOR CONTROLLING AN ELECTRONIC DEVICE, FOR CONTROLLING A COMPUTER GAME AND FOR USER VERIFICATION

CROSS-REFERENCE TO PRIOR APPLICATIONS

Priority is claimed to U.S. Provisional Application No. 61/300,569, filed Feb. 2, 2010, and to European Application No. EP 10 15 2404.9, filed Feb. 2, 2010. The entire disclosure of each application is hereby incorporated by reference herein.

FIELD

The present invention relates to a controlling apparatus, a computer program, a use of the electronic device for controlling a computer game, a use of the electronic device for verification of a user and to a method for controlling the electronic device. The electronic devices, controlling apparatuses and computer programs can be used for interacting between a user and an application running on the electronic device such as a computer game or a user verification.

BACKGROUND

Around device interaction (ADI) is being increasingly investigated as an efficient interaction technique for mobile and/or tangible electronic devices. In this context, ADI relates to human-computer-interaction between a user and an electronic device based on the recognition of gestures of the user in the proximity of the electronic device. Such ADI can provide possibility of extending interaction space of small mobile devices beyond their physical boundary allowing effective use of the three dimensional (3D) space around the device for interaction between a user and the device. This can be especially useful for small tangible/wearable mobile or controller devices such as cell phones, wrist watches, headsets, personal digital assistants (PDA), media players etc. In these devices, it is usually comparably difficult to operate small buttons and touch screens particularly since parts of the touch screen are usually covered by the hand of the user during interaction.

For preventing these drawbacks and in particular for using the space beyond a device which can be easily used no matter how small the device is, a plurality of ADI concepts have been developed which are based on the use of different sensory inputs such as camera, infrared distance sensors, touch sensor at the back of device, etc. These concepts can allow coarse movement-based gestures made in the 3D space around the device to be used for sending different interaction commands such as turning pages (in an e-book or calendar), changing sound volume, zooming, rotation, etc. For example, the publication "HoverFlow: expanding the design space of around-device interaction" of Kratz, S. and Rohs, M., published by proceedings of the 11$^{th}$ International Conference on Human-Computer Interaction with Mobile Devices and Services, Bonn, Germany, September 2009, describes an ADI interface that allows mobile devices to track coarse hand gestures performed above the device's screen. Thereby, infrared proximity sensors are used to track hand and finger positions in the device's proximity. The hand or finger gestures are detected using a specific algorithm and a rough overview of the design space of according ADI-based interfaces is provided. However, the ADI concepts of the prior art all rely on specific physical arrangements which are not standard in electronic devices today. Consequently, the implementation of these ADI concepts is rather complex and expensive. Further, most of these ADI concepts, in particular the ADI concepts allowing for a contactless interaction between the user and the device, require visual contact between the hand/finger of the user and the device. This can constrict the application of the ADI concepts.

SUMMARY

In an embodiment, the present invention provides an electronic device having an around device interaction module configured to interact with a user of the electronic device. The around device interaction module includes a magnetic sensor operable to measure a magnetic field strength of a magnetic element and a control unit configured to control the electronic device based on a movement of the magnetic element while the magnetic sensor measures the magnetic field strength of the magnetic element.

BRIEF DESCRIPTION OF THE DRAWINGS

The electronic device, the controlling apparatus, the computer software, the uses and the method according to the invention are described in more detail below by way of exemplary embodiments and with reference to the attached drawings. The present invention is not limited to the exemplary embodiments. Other features and advantages of various embodiments of the present invention will become apparent by reading the following detailed description with reference to the attached drawings which illustrate the following.

DETAILED DESCRIPTION

Figure 1:
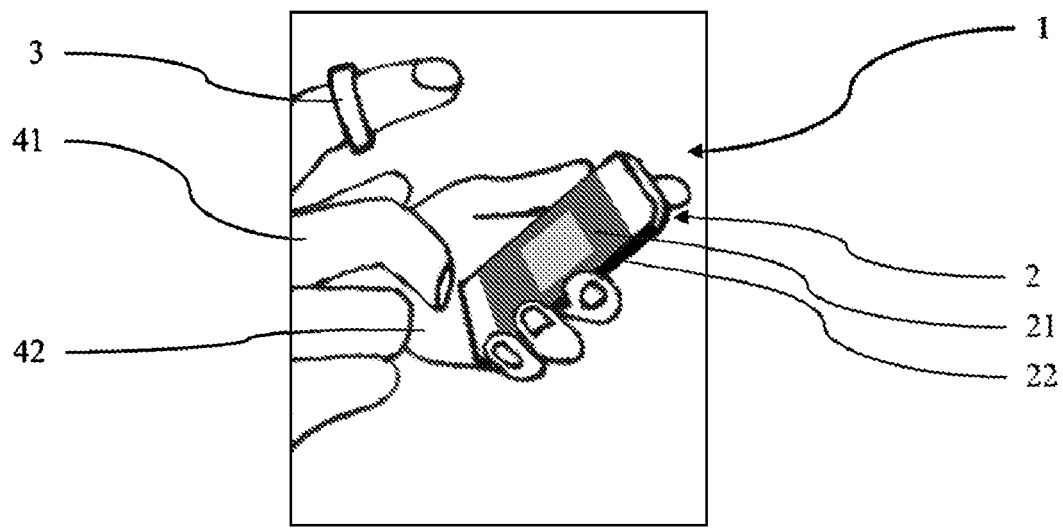
FIG. 1 shows a perspective view of a first embodiment of a controlling apparatus according to the present invention comprising a first embodiment of an electronic device according to the present invention running a computer program according to the invention.

Therefore, the present invention identifies a need for around device interaction (ADI) which is comparably simple to implement on standard electronic devices and which allows use in a comparably wide field of applications.

In an embodiment, the present invention provides an electronic device having an around device interaction means for interacting with a user of the electronic device. The around device interaction means of the electronic devices comprises a magnetic sensor for measuring a magnetic field strength and controlling means with which the electronic device is controllable according to a movement of a magnetic element while the magnetic field strength of the magnetic element is measured by the magnetic sensor. The electronic device can preferably be a mobile device such as a laptop computer, a tablet computer or the like and in particular a comparably small mobile device such as a mobile phone, a personal digital assistant (PDA), a media player, e.g. a sound and/or video player, a watch, e.g. a wrist watch, a headset or the like. The ADI according to the invention can particularly be used for the interaction between a user and a computer application being stored on and executed by the electronic device, such as a computer game.

According to an embodiment of the present invention, the human-computer-interaction is based on the magnetic sensor or compass sensor, respectively, which is integrated in more and more standard electronic devices and in particular in mobile electronic devices such as, e.g., the mobile phone of the company Apple Inc. marked as "iPhone 3GS" or the mobile phone of the company Google Inc. marked as "G1 Android". For such devices, the ADI according to an embodiment of the present invention can be applied by implementing the controlling means and by using a properly shaped magnetic element. Thus, the human-computer-interaction can be implemented in a comparably simple and efficient manner. For interacting with the electronic device, the user takes the properly shaped magnetic element, which can be, e.g., in shape of a rod, a pen, a stick or a ring, in hand and draws coarse gestures in the 3D space around the electronic device. For example, such gestures can be movements of the magnetic element in front or at the back of the electronic device wherein gestures at the back of the electronic device allow a user interaction without covering the screen with the hand of the user. The gestures can be interpreted as different interaction commands by the controlling means of the electronic device. According to an embodiment of the present invention, it is also possible for the user to interact with the electronic device without being in visual contact with it. For example, the user can interact with the electronic device through a textile such as hanging-up a mobile phone which is in a bag or pocket by performing an appropriate gesture with the magnetic element near the bag or pocket.

Preferably, the magnetic sensor is arranged to measure magnetic field strengths in three dimensions and the controlling means has an evaluation means being arranged to evaluate a change of the measured magnetic field strength of the magnetic element in at least one of the three dimensions. Thereby, the magnetic strengths can particularly be measured in an x-direction, in a y-direction and in a z-direction and the change of the measured magnetic field strength of the magnetic element can be evaluated in the three dimensions. Like this, three dimensional (3D) gestures can be used for controlling the electronic device allowing a sophisticated 3D user interaction.

Since the magnetic sensor of the electronic device can be affected by various magnetic fields around the electronic device, the controlling means preferably has a filter means being arranged to filter changes of measured magnetic field strengths with regard to the speed of said changes. Like this, the influence of magnetic fields not originating from the magnetic element, such as e.g. the earth's magnetic field, can be decreased and the quality of gesture recognition can be enhanced. In particular, comparably slow changes of measured magnetic field strengths can be disregarded in order to reduce the influence of non-gesture induced changes from gesture induced changes which usually are comparably fast. Thus, gesture induced magnetic field strength changes can be separated from measured magnetic field strengths induced by other magnetic fields such as the earth's magnetic field. Further, the changes of measured magnetic field strengths as a function of time can be evaluated by subtracting consecutive measured magnetic field strengths.

Preferably, the controlling means has a feature extraction means being arranged to extract predefined features of a change of the measured magnetic field strength of the magnetic element. Predefined features in this context can be an average magnetic field strength in different directions, an average piecewise correlation between magnetic field strength in different direction, a zero crossing rate for different direction, combinations thereof or the like. Thereby, piecewise correlation can particularly be calculated between magnetic field strengths along x and y, x and z, and y and z directions. For instance, correlation between x and y magnetic field strengths can be calculated as follows:

$$r_{xy} = \frac{\sum_{i=1}^{n}(x_i - \bar{x})(y_i - \bar{y})}{(n-1)s_x s_y}$$

where $r_{xy}$ is correlation between magnetic field strengths along x and y axis, $x_i$ and $y_i$ are $i^{th}$ element of magnetic field strengths along x and y axis (respectively), $\bar{x}$ and $\bar{y}$ are mean of magnetic field strength along x and y axis, and $s_x$ and $s_y$ are standard deviations of magnetic field strength along x and y axis.

Such feature extraction allows for qualifying the evaluated changes of the measured magnetic field strengths such that changes being relevant for gesture recognition can be assessed. In particular, said features can be extracted from filtered changes of the magnetic field strengths which allows a comparably efficient gesture recognition and user interaction.

Preferably, the controlling means has an identification means being arranged to identify a start of the movement of the magnetic element when a magnitude of the measured magnetic field strength of the magnetic element exceeds a threshold and an end of the movement of the magnetic element when the magnitude of the measured magnetic field strength of the magnetic element falls below the threshold. In this context, the term "magnitude of the measured magnetic field strength" relates for example to Euclidian norm of field strength along x-, y- and z-directions. Like this, an efficient identification of gesture induced movements is possible.

Preferably, the controlling means has a classification means being arranged to classify the movement of the magnetic element. With such classification different movements or gestures can be ordered and associated to a specific control or of the electronic device. Thereby, the controlling means preferably are arranged to induce a predefined function of the electronic device corresponding to the classification of the movement of the magnetic element. In particular, the function can be a command, e.g., to control a computer game or any other computer program being stored on and executed by the electronic device. Like this, a specifically identified and accordingly classified movement of the magnetic element can be associated to a specific command such that the user can induce a specific command by moving the magnetic element in a specific manner, i.e. by performing a specific gesture. Further, the classification of movements of the magnetic element or of gestures, respectively, can be done based on the extracted features using a heuristically designed binary decision tree. Compared to known statistical machine learning algorithms such a decision tree algorithm can run faster on the electronic device. Correlation between different directions, magnitude in different directions and zero crossing rate can be used as basis for decision making and such classification.

Preferably, the controlling means is arranged to control the electronic device according to a movement of a further magnetic element while the magnetic field strength of the further magnetic element is measured by the magnetic sensor. Such around device interaction with two magnetic elements can allow for more complex and more sophisticated movements or gestures and interactions using two hands or two fingers, respectively. For example, this can be useful for multi player computer games stored on and executed by the electronic device. Thereby, the controlling means preferably is arranged to distinguish between a movement of the magnetic element and a movement of the further magnetic element by evaluating the polarities of the magnetic element and the further magnetic element wherein the magnetic element and the further magnetic element have opposite polarities. Like this, movements of the magnetic element and the further magnetic element can be distinguished comparably easily.

A further aspect of an embodiment of the present invention relates to a controlling apparatus comprising an electronic device as described above and a manually moveable magnetic element. As also described above, such a controlling apparatus allows a comparable simple, efficient, comfortable and sophisticated around device interaction (ADI) between the electronic device and its user. Thereby, the magnetic element preferably is a magnetic finger ring or a magnetic stick. Such magnetic elements allow a comparably comfortable handling of the magnetic element and comparably exact gesture recognition. Further, the apparatus can comprise two magnetic elements, for example of opposite polarities.

Another further aspect of an embodiment of the present invention relates to a computer program being storable on the electronic device as described above and being executable by the electronic device, wherein the computer program is arranged to implement the controlling means of the electronic device when being executed on the electronic device. Such a computer program allows a comparably simple and convenient implementation and distribution of the around device interaction on standard electronic devices.

Another further aspect of an embodiment of the present invention relates to the use of an electronic device described above for controlling a computer game being executed on the electronic device, wherein the controlling means perform interaction between a user of the computer game and the computer game. Thereby, the controlling means can be part of the computer game. Thus, the around device interaction according to an embodiment of the present invention can be used for 3D interaction with computer games. Compared to other interaction techniques with computer games and in particular mobile games which are mainly based on touch, movement or orientation of the mobile device, a more user friendly interaction can be provided, the 3D space around the device can be used efficiently, the user interaction does not occlude the screen and the user interaction does not impose moving or tilting the electronic device.

Another further aspect of an embodiment of the present invention relates to the use of an electronic device as described above for controlling a computer game being executed on the electronic device, wherein the controlling means perform interaction between a user of the computer game and the computer game such that the computer game is controlled by movements of the magnetic element and the further magnetic element simultaneously. Again, the controlling means can be part of the computer game and the around device interaction according to an embodiment of the present invention can be used for 3D interaction with computer games. For example, the movements or gestures, respectively, of both hands of the user or of two fingers of the user can be included for controlling the computer game such as moving an avatar in different directions in a virtual 3D environment or make the avatar or objects do different actions. Compared to other interaction techniques with computer games and in particular mobile games which are mainly based on touch, movement or orientation of the mobile device, a more user friendly interaction can be provided, the 3D space around the device can be used efficiently, the user interaction does not occlude the screen and the user interaction does not impose moving or tilting the electronic device. Such a control of the computer game with multiple magnetic elements provides the possibility for comparably flexible and advanced interactions allowing particular sophisticated and realistic gaming interaction.

Further, in security technology there are many techniques available today for authentication of humans which can, e.g., be based on a pin code, on face recognition, or on a finger-print. All these techniques have their advantages and disadvantages. Pin codes are not very secure since once they are stolen, they can be used from any places to access services. Face recognition can be simulated by using a picture. Finger print authentication can also be broken by steeling the user finger print from, e.g., a water glass. Furthermore, adding a finger print sensor to a device is comparably expensive. In this context, another further aspect of an embodiment of the present invention relates to the use of an electronic device described above for verification/authentication of a user wherein the user performs a signature movement with the magnetic element and the controlling means verify the user by evaluating said signature movement. Therein, in order to verify identity of a user based on a signature, a statistical model for the user can be created during a training process. The statistical model which is used can be for instance a Gaussian Mixture Model (GMM). Once the model is created based on feature samples of the user, the system is ready for verifying signatures of the user. For a new signature, extracted features can be matched against the trained statistical model and a likelihood score based on the match can be estimated. The likelihood score can then be compared with a threshold to decide to accepting/rejecting the claimed identity of the user.

Compared with some of the mentioned authentication techniques, magnetic sensors are a low cost hardware component which is already embedded in many devices and also the magnetic element is a low cost hardware component. Additionally, the use of the electronic device for verification/authentication of a user provides a comparably secure way for user authentication based on his natural real signature. This use is hardly to forge and easy to apply. Even recording/observing the user interaction by is not useful since this interaction contains biometrical features. These biometrical features are very unique and can not be simulated by other persons or machines.

Another further aspect of an embodiment of the present invention relates to a method for controlling an electronic device according described above wherein a magnetic field strength of the magnetic element is measured by the magnetic sensor of the around device interaction means and a controlling function is induced by the controlling means of the around device interaction means according to the movement of the magnetic element based on the measures of the magnetic field strength of the magnetic element.

These and other aspects of the present invention will be apparent from and elucidated with reference to the embodiments described below.

In the following description certain terms are used for reasons of convenience and are not to be interpreted as limiting. The terms "right", "left", "under" and "above" refer to directions in the figures or to specific objects shown therein. The terminology comprises the explicitly mentioned terms as well as their derivations and terms with a similar meaning.

FIG. 1 shows a first embodiment of a controlling apparatus 1 according to an embodiment of the present invention comprising a mobile phone 2 as a first embodiment of an electronic device according to an embodiment of the present invention and a magnetic ring 3 as a magnetic element. The mobile phone 2 is held by the left hand 42 of a user and the ring 3 is arranged on the index finger of the right hand 41 of the user. The mobile phone 2 has a standard touch sensitive screen 21 and a standard magnetic sensor. Further, it stores and executes a computer program 22 according to an embodiment of the present invention which implements controlling means on the mobile phone 2.

As shown in FIG. 1 gestures are created by the user based on movement of the right hand 42 together with the ring 3 above and besides the mobile phone 2 along different 3D trajectories. The gestures and in particular the movement of the ring 3 in 3D space above and besides the mobile phone 2 affects the magnetic field sensed by the magnetic sensor of the mobile phone 2.

The following applies to the rest of this description. If, in order to clarify the drawings, a figure contains reference signs which are not explained in the directly associated part of the description, then it is referred to previous description sections.

Figure 2:
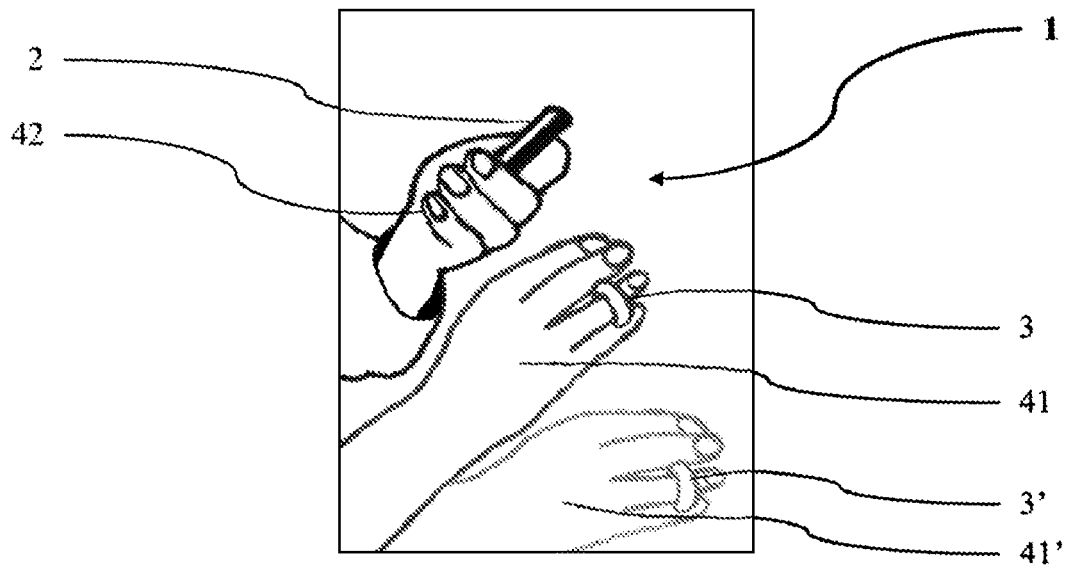
FIG. 2 shows another perspective view of the controlling apparatus of FIG. 1.

In FIG. 2 the ring 2 is arranged on a ring finger of the right hand 42 and gestures are created by the user based on movement of the right hand 42 together with the ring 3 below and besides the mobile phone 2 along different 3D trajectories. For example, such a gesture is indicated in FIG. 2 by a projection of the right hand 42' and a projection of the ring 3' moving to the right hand 42 and the ring 3.

Thus, the mobile phone 2 of FIG. 1 and FIG. 2 can be controlled by gestures above and besides the mobile phone 2 as well as by gestures below and besides the mobile phone 2. For example, an application can be implemented on the mobile phone 2 based on the computer program 22 wherein specific interaction gestures are used to turn pages left-right or up-down in a photo view or in a document view and to zooming a map in and out. Thereby, the zooming functionality can for example be achieved by using space at the back of mobile phone 2 for gestures, so that the screen 21 does not get occluded. The application further can for example reject/accept a call using a specific gesture wherein this functionality can be achieved even when the mobile phone 2 is in a bag or pocket. This can particularly be useful for dealing with calls in places where an unexpected ring can be annoying. In addition, the application can for example also interact with a music player to change sound volume or music tracks. With such an application, users can naturally interact with the mobile phone and they can induce different interaction commands using different movement-based gestures in the 3D space around the mobile phone 2.

Figure 3:
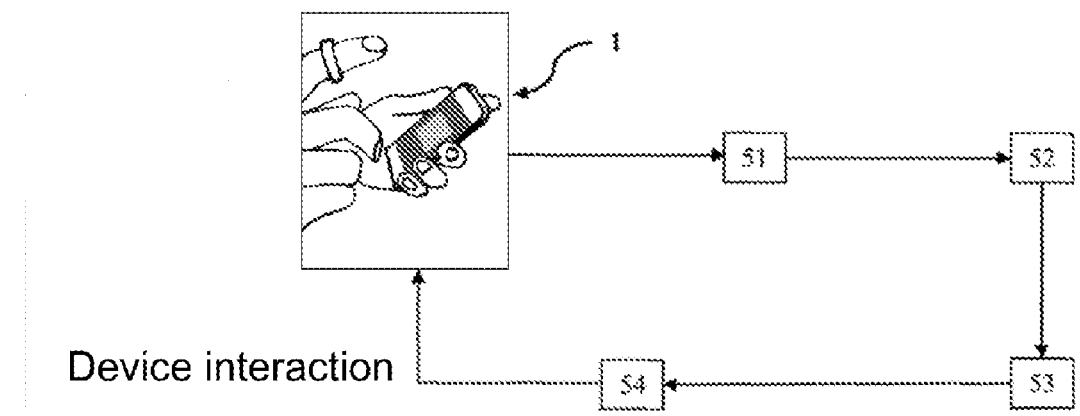
FIG. 3 shows a flow scheme of an embodiment of a principal interaction application of the controlling apparatus of FIG. 1.

In FIG. 3 an embodiment of a principal interaction application of the controlling apparatus 1 is shown. The magnetic sensor 51 or compass, respectively, of the mobile phone 2 magnetically senses a movement of the ring 3 in the neighbourhood of the mobile phone 2. The sensed signal is then passed to a pre-processing high-pass filter 52 as filter means of the controlling means of the mobile phone 2 in which signal changes of measured magnetic field strengths are filtered with regard to the speed of said changes. The high-pass filtered signal is then provided to feature extraction means 53 of the controlling means of the mobile phone 2 which extracts predefined features of a change of the signal such as, e.g., an average magnetic field strength in different directions, an average piecewise correlation between magnetic field strength in different direction or a zero crossing rate for different directions. Based on the features extracted, the signal is classified by classification means 54 of the controlling means of the mobile phone 2 which applies a statistical model (ANN) gesture classification. Finally, a device interaction is induced corresponding to the classification.

Figure 4:
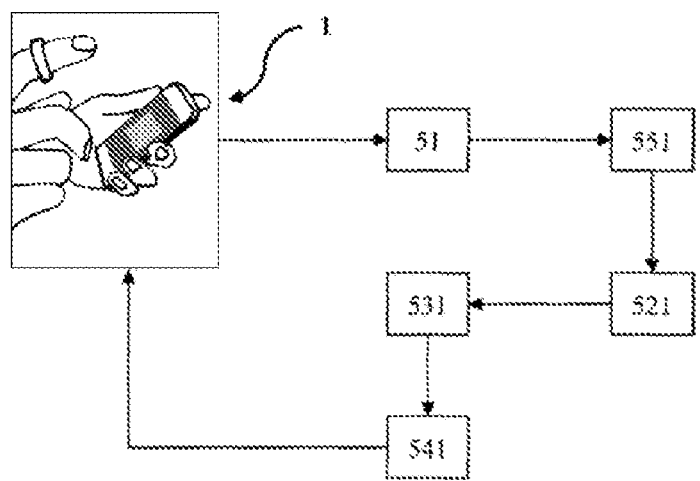
FIG. 4 shows a flow scheme of an embodiment of a gaming interaction application of the controlling apparatus of FIG. 1.

FIG. 4 shows an embodiment of a gaming interaction application of the controlling apparatus 1. Again, the magnetic sensor 51 or compass, respectively, of the mobile phone 2 magnetically senses a movement of the ring 3 in the neighbourhood of the mobile phone 2. The sensed signal is then processed by a signal decomposer 551 and passed to a pre-processing high-pass filter 521 as filter means of the controlling means of the mobile phone 2 in which signal changes of measured magnetic field strengths are filtered with regard to the speed of said changes. The high-pass filtered signal is then provided to feature extraction means 531 of the controlling means of the mobile phone 2 which extracts predefined features of a change of the signal such as, e.g., an average magnetic field strength in different directions, an average piecewise correlation between magnetic field strength in different direction or a zero crossing rate for different directions. Based on the features extracted, the signal is classified by classification means 541 of the controlling means of the mobile phone 2 which applies a statistical model (ANN) gesture classification. Finally, an interaction with a game executed on the mobile phone 2 is induced corresponding to the classification.

Figure 5:
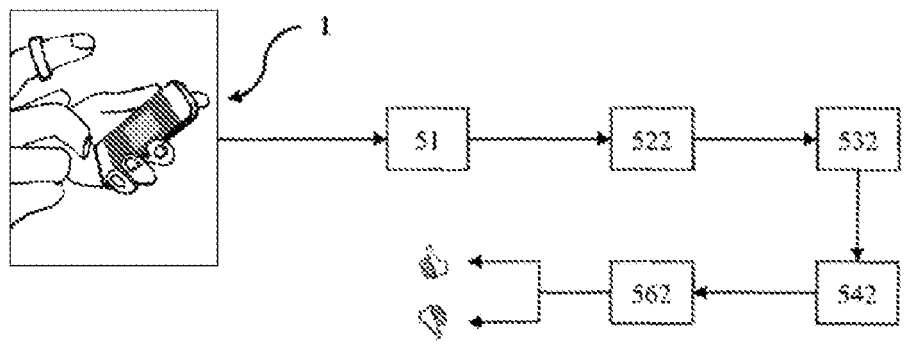
FIG. 5 shows a flow scheme of an embodiment of a verification interaction application of the controlling apparatus of FIG. 1.

In FIG. 5 an embodiment of a verification interaction application of the controlling apparatus 1 is shown. Again, the magnetic sensor 51 or compass, respectively, of the mobile phone 2 magnetically senses a signature movement of the ring 3 in the neighbourhood of the mobile phone 2 such as, e.g., a movement performed by a user for signing by a pen. The sensed signal is then passed to a pre-processing high-pass filter 522 as filter means of the controlling means of the mobile phone 2 in which signal changes of measured magnetic field strengths are filtered with regard to the speed of said changes. The high-pass filtered signal is then provided to feature extraction means 532 of the controlling means of the mobile phone 2 which extracts predefined features of a change of the signal such as, e.g., an average magnetic field strength in different directions, an average piecewise correlation between magnetic field strength in different directions or a zero crossing rate for different directions. Based on the features extracted, the signal is classified by classification means 542 of the controlling means of the mobile phone 2 which applies a statistical model (GMM) match against model gesture classification and which provides a matching score. Finally, the matching score is processed by a decision component 562 of the controlling means of the mobile phone 2 which decides either to accept the signature movement or to reject it.

Figure 6:
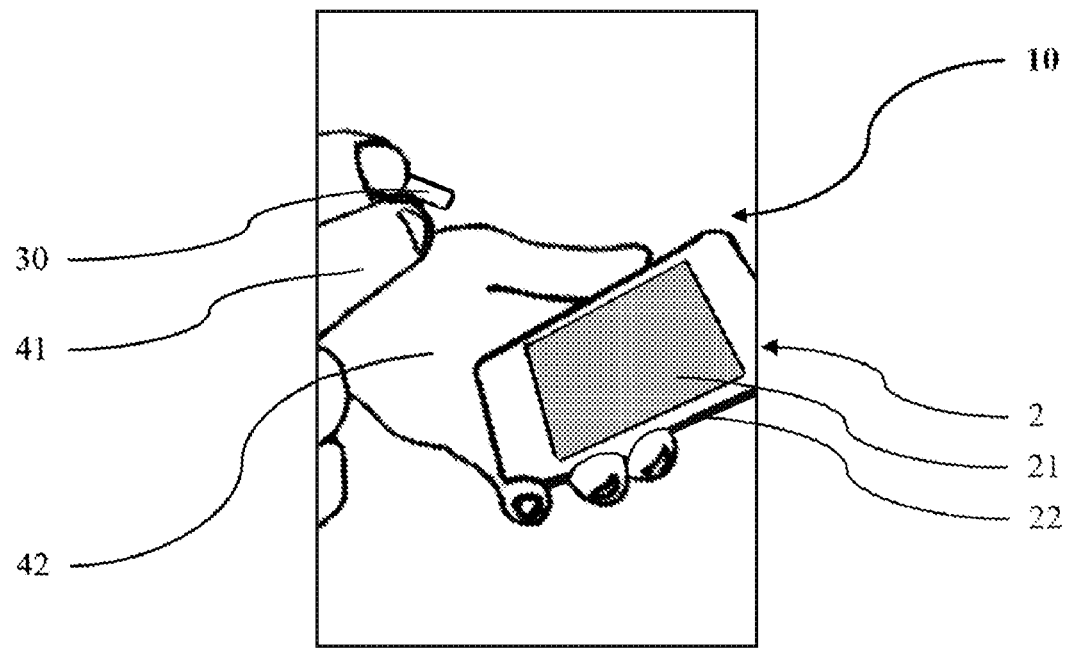
FIG. 6 shows a perspective view of a second embodiment of a controlling apparatus according to the invention comprising the electronic device of FIG. 1.
Figure 7:
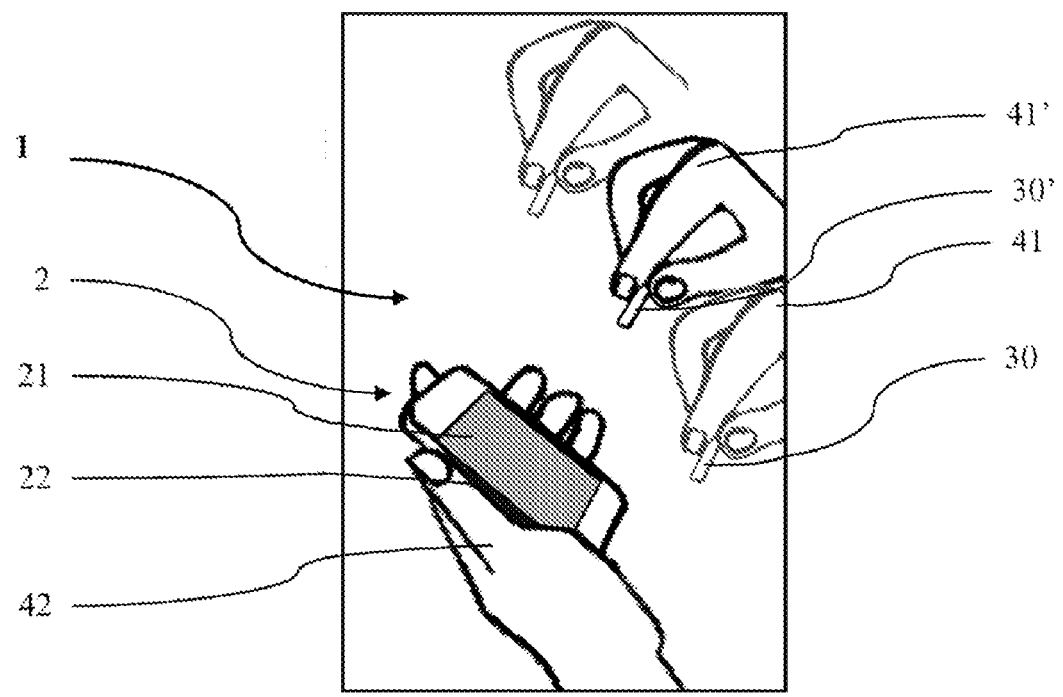
FIG. 7 shows another perspective view of the controlling apparatus of FIG. 3.
Figure 8:
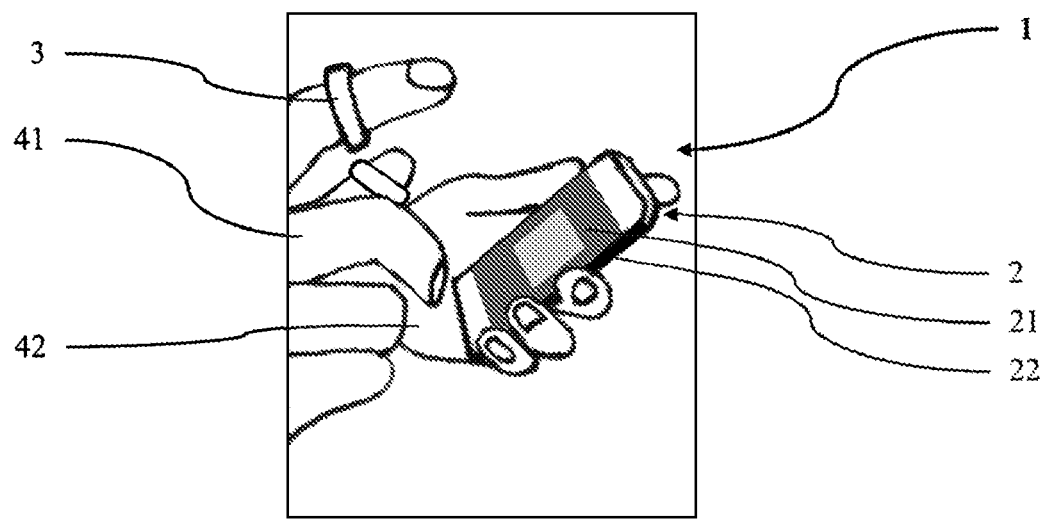
FIG. 8 shows a perspective view of a further embodiment of a controlling apparatus according to the present invention.

FIG. 6 and FIG. 7 show a second embodiment of a controlling apparatus 10 according to an embodiment of the present invention. Thereby, the controlling apparatus 10 comprises a stick 30 as magnetic element. The stick 30 can be used for gesture recognition in order to control the mobile phone 2 corresponding to the gesture recognition described above.

Summarizing the embodiments shown in FIGS. 1 to 4, the magnetic sensor or compass, respectively, integrated in the mobile phone 2 by default is used for around device interaction (ADI) between the human user and the mobile phone 2. Thereby a regular magnetic element in a proper shape to be taken in hand, i.e. the ring 3 or the stick 30, is used to influence the magnetic sensor by different movement-based gestures and hence interact with the device. This interaction can be used in a broad variety of different applications such as turning pages, zooming, reacting to a call alert, and music playback. Compared to known ADI techniques, getting useful information from magnetic sensor is algorithmically much simpler than implementing computer vision techniques. Further, the ADI according to an embodiment of the present invention does not suffer from illumination variation and occlusion problems and does not impose changes or adding huge number of extra sensors to electronic devices. For electronic devices having a magnetic sensor, according to an embodiment of the present invention, it is only necessary to have a properly shaped magnetic element as an extra accessory. In addition, considering the fact that the back of mobile electronic device is usually covered by hand, optical ADI techniques (e.g. camera and infra-red based) can face difficulties for using the space at the back of device. However, since the interaction of the ADI according to an embodiment of the present invention is based on magnetic field which can pass through hand, the space at the back of device can be efficiently used for interaction.

While the invention has been illustrated and described in detail in the drawings and foregoing description, such illustration and description are to be considered illustrative or exemplary and not restrictive. It will be understood that changes and modifications may be made by those of ordinary skill within the scope and spirit of the following claims. In particular, the present invention covers further embodiments with any combination of features from different embodiments described above and below. For example, it is possible to operate the present invention in an embodiment wherein:

The ADI according to the invention is used for 3D interaction with mobile games. Coarse gestures made by movement of the magnetic element in the 3D space around the device can be interpreted as different interaction commands for the games objects/avatars. The gestures can be used to move an avatar in different directions in a virtual 3D environment or make the avatar or objects do different actions. Compared to current interaction techniques with mobile games which are mainly based on touch, movement or orientation of the mobile device, the ADI according to the invention provides a more user friendly interaction. Therein, the 3D space around the device can be used efficiently and the interaction does not occlude the screen unlike touch based interaction. In addition, unlike movement or orientation based methods, the ADI according to the invention does not impose moving or tilting the device. Tilting or moving the device and consequently the device's screen as well can disturb the concentration of user on the screen and game. Moreover, the 3D nature of the gestures can provide the possibility to interact with the objects in the game in 3D manner and make them move or act in the 3D space.

The ADI according to the invention is used for 3D interaction with mobile games including a second magnetic device as a second interaction mean. The second magnet can have optionally different polarity so that the gestures created by the second magnet can be distinguished from the first ones. This can especially be useful for multi-player games. In this case, each user interacts with one magnet. Moreover, using multiple magnets can allow for more complex gestures and interactions using two hands or two fingers. Considering gaming applications, more complex gestures can be for instance used in playing percussion with two drum sticks, shooting with two guns or controlling of Chinese diabolo.

The ADI according to the invention is used for complementing a pin code mechanism or replacing this mechanism for accessing a device or service by a 3D electronic signature as explained above, i.e. a magnetic signature. Using the magnetic signature can increase the security since it can not be hard copied or imitated easily.

The ADI according to the invention is used for replacing entering a user name by a magnetic signature, especially if the device has a limited number of users. This scenario can be very useful for mobile devices or for home environments such as home computers or entertainment devices.

The ADI according to the invention is used for authentication by magnetic signature which can be used from any where to access a certain service over a mobile device and which can enable a very secure mobile authentication method. For example, a user who wants to access a specific internet portal from an internet café can use his mobile phone as an additional authentication for more security. The user will receive a one-time password on his mobile phone which can be read only by authentication via the magnetic signature. This password can be use for accessing the internet portal.

The ADI according to the invention is used for assigning gestures in the proximity of a mobile device with certain application/service names or telephone numbers. This can enable the user to run an application directly without using traditional a graphic user interface.

The ADI according to the invention is used for assigning a gesture in the proximity of a mobile device to a phone number which enables the user to place a call with out touching the phone device. This can be very useful when a mobile phone whit a head-set is used. This technique can also provide a new human interface for handicapped people like patients in hospitals.

The electronic device according to the invention can also comprise a plurality of magnetic sensors for capturing magnetic field changes in the space around the electronic device and thereby allowing a comparably sophisticated ADI.

The present invention also covers all further features shown in the Figs. individually although they may not have been described.

Furthermore, in the claims the word "comprising" does not exclude other elements or steps, and the indefinite article "a" or "an" does not exclude a plurality. A single unit or means may fulfill the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. A computer program may be stored/distributed on a suitable medium, such as an optical storage medium or a solid-state medium supplied together with or as part of other hardware, but may also be distributed in other forms, such as via the Internet or other wired or wireless telecommunication systems. In particular, a computer program may be a computer program product stored on a computer readable medium, having computer readable program code adapted to be executed to implement a specific method such as the method according to the invention.

While the invention has been particularly shown and described with reference to preferred embodiments thereof, it will be understood by those skilled in the art that various changes in form and details may be made therein without departing from the spirit and scope of the invention.

What is claimed is:

1. A mobile electronic device, comprising:
    an around device interaction module configured to interact with a user of the mobile electronic device, the around device interaction module comprising:
        a compass sensor operable to measure a magnetic field strength of a magnetic element, the magnetic element being movable by the user; and
        a control unit configured to control the mobile electronic device by gesture recognition based on a movement of the magnetic element while the compass sensor measures the gesture-induced magnetic field strength of the magnetic element;
    wherein the compass sensor is configured to measure the gesture-induced magnetic field strength of the magnetic element in three dimensions and wherein the control unit includes an evaluation unit configured to evaluate a change of the measured gesture-induced magnetic field strength of the magnetic element in three dimensions.

2. The mobile electronic device according to claim 1, wherein the control unit includes a filter configured to filter changes of the measured magnetic field strength based on the speed of the changes.

3. The mobile electronic device according to claim 1, wherein the control unit includes a feature extraction unit configured to extract predetermined features of a change of the measured magnetic field strength of the magnetic element.

4. The mobile electronic device according to claim 1, wherein the control unit includes an identification unit configured to identify a start of the movement of the magnetic element when a magnitude of the measured magnetic field strength of the magnetic element exceeds a threshold and an end of the movement of the magnetic element when the magnitude of the measured magnetic field strength of the magnetic element falls below the threshold.

5. The mobile electronic device according to claim 1, wherein the control unit includes a classification unit configured to provide a classification the movement of the magnetic element.

6. The mobile electronic device according to claim 5, wherein the control unit is configured to induce a predetermined function of the mobile electronic device based on the classification of the movement of the magnetic element.

7. The mobile electronic device according to claim 1, wherein the control unit is configured to control the mobile electronic device based on a movement of an additional magnetic element while the magnetic field strength of the additional magnetic element is measured by the compass sensor.

8. The mobile electronic device according to claim 7, wherein the magnetic element and the additional magnetic element have opposite polarities and wherein the control unit is configured to distinguish between the movement of the magnetic element and the movement of the additional magnetic element by evaluating the polarities of the magnetic elements.

9. The mobile electronic device according to claim 7, wherein the control unit is configured to interact between a user of a computer game being executed on the mobile electronic device and the computer game so as to simultaneously control the computer game based on the movements of the magnetic element and the additional magnetic element.

10. The mobile electronic device according to claim 9, wherein the magnetic element includes at least one of a magnetic finger ring and a magnetic stick.

11. The mobile electronic device according to claim 1, wherein the control unit is configured to interact between a user of a computer game being executed on the mobile electronic device and the computer game so as to control the computer game.

12. The mobile electronic device according to claim 1, wherein the control unit is configured to verify a user performing a signature movement with the magnetic element by evaluating the signature movement.

13. A method for controlling an mobile electronic device comprising:
    measuring, in three dimensions, using a compass sensor of an around device interaction module, a magnetic field strength of a magnetic element movable by a user of the mobile electronic device; and
    controlling, using a control unit of the around device interaction module, the mobile electronic device according to a movement of the magnetic element based on an evaluation of a change of the measured magnetic field strength of the magnetic element in three dimensions.

14. A non-transitory computer readable medium operable on an mobile electronic device and having an executable program code encoding a method for controlling the mobile electronic device, the method comprising:
    measuring, in three dimensions, using a compass sensor of an around device interaction module, a magnetic field strength of a magnetic element movable by a user of the mobile electronic device; and
    controlling, using a control unit of the around device interaction module, the mobile electronic device according to a movement of the magnetic element based on an evaluation of a change of the measured magnetic field strength of the magnetic element in thre dimensions.

* * * * *